Figure 1:
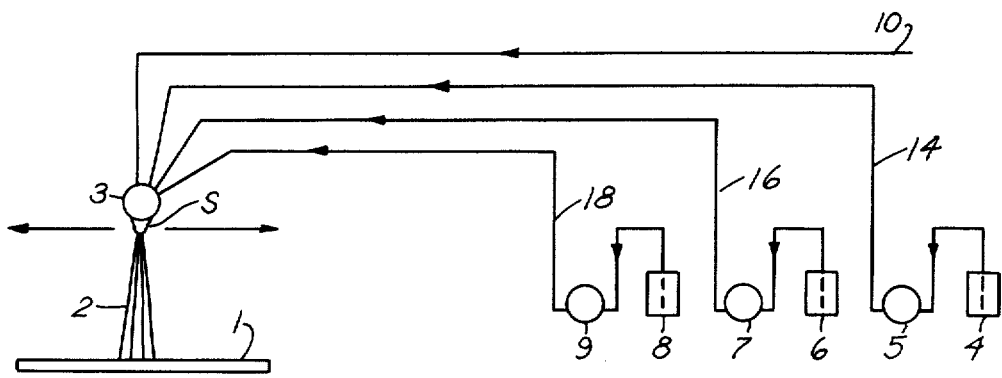

Dec. 6, 1960   A. R. WEINRICH   2,963,383
SPRAY SILVERING PROCEDURES
Filed May 14, 1959   2 Sheets-Sheet 1

INVENTOR.
ARTHUR R. WEINRICH
BY
Benjamin Sweedler
ATTORNEY

Dec. 6, 1960 A. R. WEINRICH 2,963,383
SPRAY SILVERING PROCEDURES
Filed May 14, 1959 2 Sheets-Sheet 2

INVENTOR.
ARTHUR R. WEINRICH
BY
Benjamin Sweedler
ATTORNEY

United States Patent Office 2,963,383
Patented Dec. 6, 1960

2,963,383

SPRAY SILVERING PROCEDURES

Arthur R. Weinrich, Greensboro, N.C., assignor to Kay Chemicals, Inc., Dallas, Tex., a corporation of Texas Filed May 14, 1959, Ser. No. 813,148

5 Claims. (Cl. 117—35)

This invention relates to spray silvering techniques for producing mirrors, reflectors, reflective ornaments, and other silver coated articles.

In this specification all percentages are on a weight basis.

The method of spray silvering by causing two fans or spray patterns of atomized solutions, one of an ammoniacal silver nitrate solution, and the other of a solution of a suitable reducing agent, to mix or intermingle at or just above the surface to be silvered, is well known. In the commercial application of this method in the production of silver mirrors, a concentrated solution of ammoniacal silver nitrate is diluted 40 to 1 with deionized water in a large stainless steel tank. Likewise, a concentrated reducing solution is diluted in a second stainless steel tank in substantially the same ratio of water to concentrated solution. These dilute solutions are pumped, or allowed to flow by gravity, respectively to a pair of guns or a plurality of pairs of guns from which they are sprayed onto the glass surface in a manner to make their respective spray patterns coincide in an attempt to mix the two component solutions at or just above the glass surface.

This method, while widely used in the manufacture of mirrors, is inefficient and incapable of producing efficiently uniform and dense silver deposits, because it is difficult, if not impossible, to cause the fan patterns to merge or coincide exactly to produce a uniform intermingling of the above mentioned silver nitrate solution and reducing solution. Furthermore, as the level of solution falls in the tanks during use, whether the solution is fed from these tanks to the guns by gravity or is pumped, the rate of flow from the guns continuously decreases producing thinner silver deposits unless continual adjustments are made to the spray gun settings or pump speed.

It is well known that for uniform and dense silver films, the ratio of silver nitrate solution to reducing solution must be maintained within narrow limits. Before the advent of spray silvering, this proper ratio was secured by mixing the two component solutions and pouring the resultant mixture onto the horizontal surface before the reaction had progressed too far. However, in the case of spray silvering as now carried out, the mixture of the two solutions by spraying them in their respective atomized fan patterns, so as to overlap or coincide as much as possible, does not result in the proper ratio of the component solutions because, as stated above, it is extremely difficult, if not impossible, to produce two fan shape sprays of exactly the same pattern, and equally difficult to cause these spray patterns to exactly coincide. In the first place, slight differences in nozzle or fluid tip configuration of the spray guns, due to tolerances in manufacture or differences resulting from wear, or for other reasons, cause profound differences in the fan shape of the atomized solutions. Obviously, two different fan patterns will not coincide exactly and therefore cannot result in uniform admixture of the atomized solutions.

Attempts at applying the solutions by spraying from a gun in which mixing of the two solutions takes place, have met with failure because, on even very short stoppage of spraying, the reaction continued in the gun causing silver build-up in the nozzle, choking it off, and causing pieces of the deposit to flake off producing defective mirrors.

It is among the objects of this invention to provide a method of spray silvering in which all the component solutions are sprayed in premixed form from a single spray nozzle or plurality of such nozzles rather than from a pair of nozzles or a plurality of pairs of nozzles to the members of which pair or pairs is supplied respectively silver salt solution and reducing solution. Since, in the present invention, the solutions are uniformly premixed before being fed to the nozzle, it is not necessary to use two nozzles, one for the silver salt solution and the other for the reducing solution, arranged to have their fan patterns coincide. In the present invention, a uniform mixture of the reacting solutions impinges on the glass at all portions of the spray pattern regardless of what spray pattern shape is produced.

Another object of this invention is to provide a method of spray silvering from a single nozzle or a plurality of such nozzles whereby there is no silver build-up in the nozzle; hence choking off of the nozzle or flaking off of silver causing defective mirrors does not take place in the practice of the present invention.

Still another object of this invention is to provide a method of spray silvering in which it is not necessary to dilute the concentrated solutions, thereby saving labor and time and obviating human error.

In the preferred embodiments illustrated on the drawings, the equipment shown for practicing the process of this invention involves a single nozzle for spraying the silver depositing solution on the glass or other surface to be silvered. This showing is for purposes of illustration only; a plurality of such nozzles may be used in spaced relation in the direction of movement of the surface to be silvered, such nozzle or plurality of nozzles being reciprocated transverse to the direction of movement of the surface to be silvered at a rate to apply a plurality, preferably from about 8 to 12 successive applications of silvering solutions to the surface. It will, therefore, be appreciated that the present invention is not limited to the embodiment illustrated on the drawings.

Figure 2:
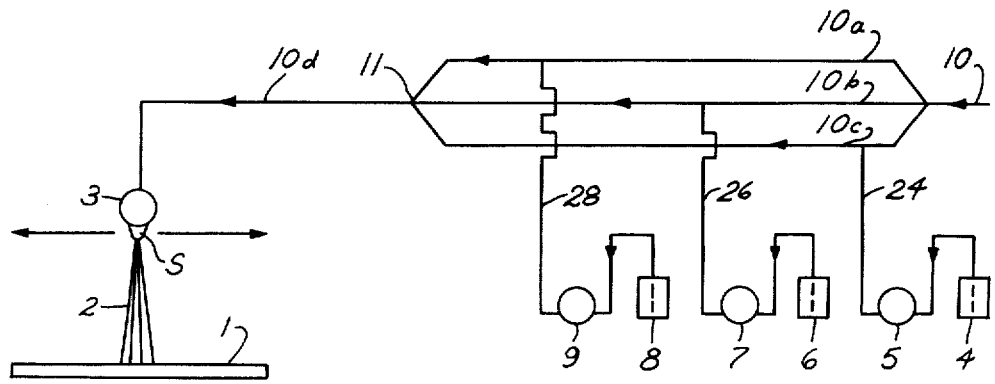
Figure 3:
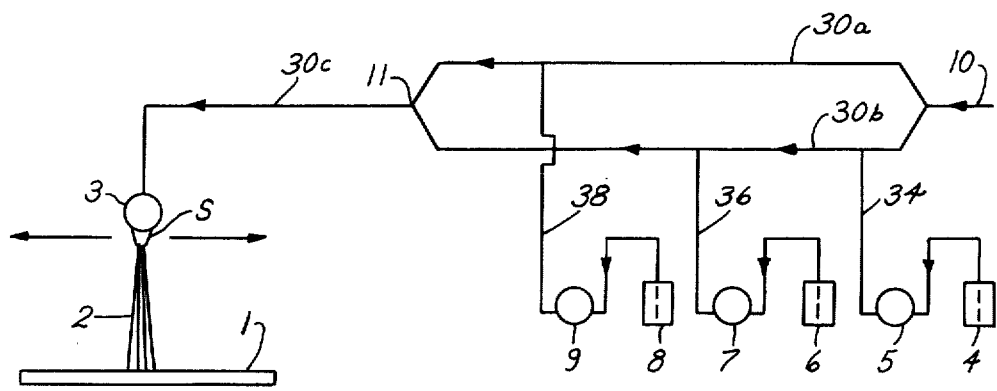
Figure 4:
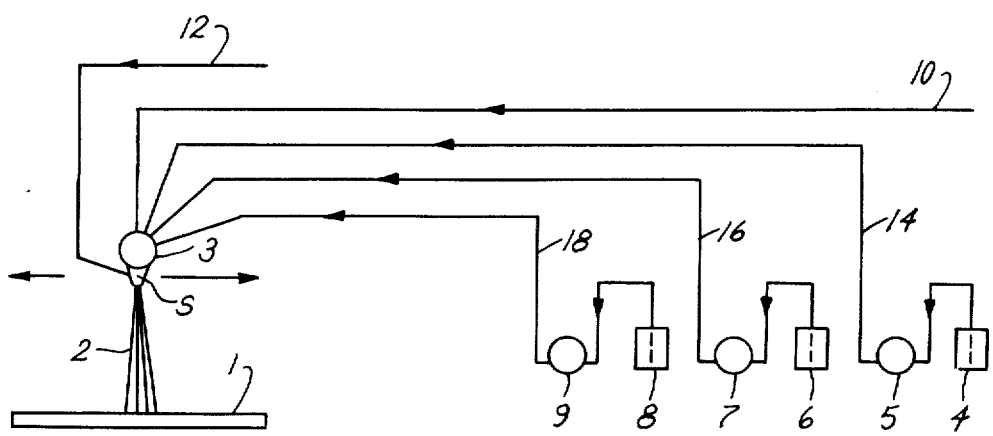

In the accompanying drawings, in which like reference characters refer to like parts, Figure 1 is a diagrammatic illustration of one arrangement of equipment for practicing this invention in which a carrier-diluent water stream and the streams of ammoniacal silver salt solution, alkali solution and reducing solution are separately introduced into a mixing chamber where they are premixed, and the mixture fed to the spray nozzle forming the silvering spray;

Figure 2 is a diagrammatic showing of a modification, in which the ammoniacal silver salt solution feeds into one water carrier-diluent stream, the alkali solution into a second, the reducing solution into a third, and the resultant water carrier-diluent streams are then mixed in a common stream which flows to the spray nozzle;

Figure 3 is still another modification in which the ammoniacal silver salt soution and the alkali solution fed onto one water carrier-diluent stream and the reducing solution into another water carrier-diluent stream, the two streams mixing to form a common stream which flows into the spray nozzle; and Figure 4 is still another modification in which, like that of Figure 1, the ammoniacal silver salt solution, the alkali solution, the reducing solution and the water carrier-diluent stream all lead into a premixer and air or inert gas is introduced into the spray nozzle to effect atomization of the mixture.

Referring first to Figure 1, 1 is the material to be silvered which may be glass or other material and which is supported on a suitable conveyor and moved under the spray nozzle S which projects the silver depositing solution in the form of atomized droplets onto the surface 1. Spray S is reciprocated in the direction indicated by the arrows transverse to the direction of movement of surface 1. The rate of reciprocation of the nozzle S may be from 8 to 12 or more times the rate of movement of the surface 1 so that a plurality of successive sprays 2 are applied in overlapping relationship to the surface 1.

In accordance with the present invention, concentrated ammoniacal silver salt solution is supplied from a source 4 to pump 5, which discharges into the conduit 14 leading to the mixing chamber 3 communicating with a spray nozzle S. While only one mixing chamber having a spray nozzle individual thereto is shown on the drawing, two or more of such mixing chambers each having a spray nozzle, and arranged in spaced relation in the direction of movement of surface 1 may be used. A concentrated alkali solution is supplied from a source 6 to pump 7 which discharges into a conduit 16 leading into the mixing chamber 3. A concentrated reducing solution is supplied from a source 8 to a pump 9 which discharges into a conduit 18 leading into the mixing chamber 3. While in the embodiments of the invention shown in the drawings, the sources or tanks 4, 6 and 8 are connected respectively to the suction side of the pumps 5, 7 and 9, which preferably are of the proportioning type permitting accurate control of the flow rate, it will be understood that the invention is not limited to this mode of operation and the pumps may be suitably supplied with these concentrated solutions in any desired manner. Moreover, instead of three concentrated solutions, one an ammoniacal silver salt solution, the second an alkali solution and the third a reducing solution, two concentrated solutions may be fed to the spray nozzle, namely, one an ammoniacal silver salt solution and the other a reducing solution.

The ammoniacal silver salt solution in 4 may contain from 8% to 32%, preferably 16% to 24%, silver nitrate and from 16% to 64%, preferably from 32% to 48%, ammonium hydroxide. The alkali solution in source 6 may contain from about 5% to 20%, preferably 10% to 15%, sodium hydroxide or from 7% to 28%, preferably 14% to 21%, potassium hydroxide. The reducing solution in source 8 may contain from 8% to 48% dextrose and from 0.2% to 1.2% formaldehyde, preferably from 16% to 32% dextrose and 0.4% to 0.8% formaldehyde. Alternatively, the reducing solution may consist of a concentrated solution of hydrazine compound or glyoxal. In every case above given the rest of the concentrated solution is water.

Leading into the mixing chamber 3 is a water line 10. Distilled or deionized water is supplied through line 10 in a volume of 10 to 100 times, preferably from 20 to 60 times, the volume of concentrated ammoniacal silver salt solution. This water is supplied at a temperature of from 40° F. to 150° F. and under pressure of 1 to 1200 pounds per square inch gauge. When operating under gas atomization as in Fig. 4, pressures in the lower portion of this range are used. When operating under hydraulic pressure, as in Fig. 1 for example, the pressure should be at least 30 pounds or higher. The water mixes with the concentrated ammoniacal silver salt solution, alkali solution and reducing solution supplied to the reciprocating mixing chamber 3 through conduits 14, 16 and 18, respectively, producing a dilute silver depositing solution issuing from nozzle S and containing from 0.1% to 0.4% silver nitrate, from 0.2% to 0.8% ammonium hydroxide, from 0.5% to 0.3% alkali metal hydroxide, from 0.1% to 0.6% dextrose, and from 0.0025% to 0.015% formaldehyde when the dextrose formaldehyde reducing solution is used. This dilute solution is preferably pumped from the nozzle S under a pressure of 300 to 600 pounds per square inch gauge and at a temperature of from 80° F. to 120° F.

In the operation of the modification shown in Figure 1, the flow of water is started through conduit 10 a fraction of a second before the flow of the concentrated solutions by pumps 5, 7 and 9 into the mixing chamber 3. The water is, of course, pumped through conduit 10 by a pump desirably of the proportioning type, permitting accurate control of the volume of water supplied to the mixing chamber 3 relative to the volumes of ammoniacal silver salt solution, alkali solution and reducing solution in the ratio hereinabove disclosed. The concentrated solutions flowing from sources 4, 6 and 8 are all started simultaneously to insure correct ratio of these three solutions to each other. The water initially supplied to nozzle S, i.e. that portion of the water stream the flow of which starts a fraction of a second before that of these three concentrated solutions, is discharged through the nozzle S. When all four streams enter the mixing chamber 3, they mix therein, forming the solution of silver depositing material of desired final concentration discharged through nozzle S producing the spray 2.

After conclusion of the silvering, the flow of concentrated silver salt solution effected by pump 5 and the flow through conduits 16 and 18 is shut off a fraction of a second before cutting off the water flow through conduit 10. During the silvering, the continuous flow of concentrated solutions and the much larger volume of water through the mixing chamber 3 and the nozzle S prevent silver deposit from building up in the nozzle S. Since the flow of water is maintained for a short time after the cessation of flow of the concentrated solutions in a volume of from 10 to 100 times the volume of the concentrated silver nitrate solution flowing through the nozzle S, this water flushes out of the nozzle, leaving it clean and free of reactive solutions. Hence, silver deposit or build up in the nozzle S is prevented and this nozzle is thus maintained in condition to operate satisfactorily at all times.

By controlling the water flow rate within the range above given, a silver salt depositing solution of desired concentration will issue from the nozzle S. Thus, by decreasing the water flow rate, say to a value near the lower portion of the range, a heavier silver deposit will result. By increasing the water flow rate, a decrease in silver concentration will result with consequent formation of a thinner silver deposit. In the production of mirrors having a silver layer of desired thickness, when the water flow rate is increased, the spraying time is proportionately lengthened to build up the desired thickness of silver.

In accordance with this invention, by maintaining the water temperature constant, as well as the flow rate for a given concentration of silver salt solution, a fixed and uniform thickness of silver film is obtained. Thus, the invention permits the formation of mirrors and other silvered surfaces having uniform and constant thicknesses of silver.

The modification of Figure 2 differs from that of Figure 1 chiefly in that the water line 10 is divided into three branches, 10a, 10b and 10c. The ammoniacal silver salt solution is pumped from source 4 by pump 5 into a conduit 24 communicating with branch 10c. The alkali solution is pumped from source 6 by pump 7 into a conduit 26 which communicates with branch 10b. The reducing solution from source 8 is pumped by pump 9 into a conduit 28 into branch 10a. The three branches meet at 11 and discharge into the conduit 10d which communicates with the mixing chamber 3.

As the ammoniacal silver salt solution mixes with the water in 10c, the alkali solution mixes with the water in 10b and the reducing solution mixes with the water in 10a, and as the resultant dilute solutions mix in 10d, partial reaction takes place so that when the resultant mixture is discharged from the chamber 3 into the nozzle S, it is in an ideal state of reactivity to deposit silver on surface 1 when spray 2 strikes this surface.

This mode of operation is ideally suited for spray silvering at low temperatures with consequently relatively slow rates of reaction, or when using solutions which react relatively slowly. The length of conduit 10d, i.e., the distance from point 11 where the three branches 10a, 10b and 10c, converge to the mixing chamber 3, is chosen to give a discharge of silver depositing solution from S of the optimum rate of reactivity to form silver on surface 1. This distance may be a few inches, say three inches or more, to five or more feet, depending upon the reaction rate of the solutions at the temperature at which they are mixed and sprayed, their flow rates and the water flow rate through 10, 10a, 10b, 10c and 10d. This reaction rate, of course, depends on the solution formulations and temperature. The optimum distance for 10d can readily be determined for any given solution formulations and temperature by a few trial experiments.

With solution concentrations of the preferred range of 16% to 24% silver nitrate, 32% to 48% ammonium hydroxide for the ammoniacal silver salt solution, from 10% to 15% sodium hydroxide for the alkali solution, and from 16% to 32% dextrose and 0.4% to 0.8% formaldehyde for the reducing solution, at a temperature of 120° F., with a flow rate through nozzle S of approximately 60 gallons per hour, using a mixing line 10d, ⅜ of an inch inside diameter, the distance from 11 to nozzle S should be about six inches.

Under the same conditions, but at a temperature of 40° F., the distance from point 11 to nozzle S should be about 50 feet to have the silver depositing solution issue from nozzle S in the same state of reactivity.

In the modification of Figure 3, the water main 10 is provided with two branches 30a and 30b. The ammoniacal silver salt solution is fed by pump 5 from source 4 through conduit 34 into branch 30b. The alkali solution is fed by pump 7 from source 6 into conduit 36, which also communicates with branch 30b; thus the ammoniacal silver salt solution and the alkali solution are diluted by the water stream flowing through branch 30b. The reducing solution is fed from source 8 by pump 9 into conduit 38 which leads into branch 30a. The reducing solution is thus diluted by the water stream passing through branch 30a. Two streams flowing through brances 30a and 30b meet at 11 and flow through conduit 30c through the mixing chamber 3 which communicates with the spray nozzle S.

As in the case of the modification of Figure 2, the distance between point 11 and the mixing chamber, i.e. the length of conduit 30c, is independent on the temperature at which the concentrated solutions are fed, their reactivity, the temperature of the water and its rate of flow. Conduit 30c is of such length as to produce a silver depositing solution having the optimum rate of reactivity emanating from nozzle S to produce dense silver deposits on surface 1. The length necessary to give this result can readily be determined as explained above in connection with Figure 2.

The modification of Figure 4 differs from that of Figure 1 in that the nozzle S is provided with a flow line 12, such, for example, as an air pressure line to effect atomization of the mixture. In this modification, the water pressure is just sufficient to provide desired flow rate to the mixing chamber 3, for example, at a pressure of from 1 to 10 pounds per square inch gauge. The spraying or atomizing pressure is furnished by the compressed air or other inert gas such as nitrogen supplied through line 12. Using an orifice for nozzle S in the range of 0.04 to 0.08 inch in diameter, air pressure in the range of 20 to 80 pounds and water pressure in line 10 in the range of 1 to 10 pounds per square inch gauge gives excellent results.

The following example is given for purposes of illustrating the invention. It will be appreciated that the invention is not limited to this example. The equipment used in carrying out the example was of the type shown in Figure 1.

A solution containing 24% silver nitrate and 48% ammonium hydroxide was pumped through conduit 14 into mixing chamber 3 at a rate of one gallon per hour. A solution of 16% sodium hydroxide was pumped through conduit 16 into chamber 3 at the same rate. A solution containing 40% dextrose and 1% formaldehyde was pumped into this chamber also at the same rate. All of these solutions were at room temperature (70°F.). Distilled water was pumped through conduit 10 at a temperature of 100°F. under 300 pounds pressure at the rate of 80 gallons per hour. The resultant mixed solution was sprayed on the glass (4½ feet wide) fed at a rate of four feet per minute. The nozzle S reciprocated 10 times back and forth during each 4-feet of movement of the surface 1

In three 20-minute spray periods, 900 square feet of silvered mirrors were produced, having a uniform thickness of 0.120 gram of silver per square foot of glass surface.

At the end of the first 20-minute spray period, the flow of the concentrated solutions was interrupted before cutting off the water flow and the water flow was interrupted about a second later. After a 20-minute hiatus, the nozzle was inspected and was found to be free of silver deposit. Operation was resumed for 20 minutes; at the end of this time the flow of concentrated solutions was interrupted and a second later the water also. Again the nozzle was inspected and found to be free of silver deposit. Operation was again resumed after about 20 minutes, and at the end of the third 20-minute spray period, the flow of concentrated solutions to the mixing chamber 3 was shut off while the flow of water was continued for a second. Then the flow of water was shut off, the nozzle inspected and found to be free of silver deposit.

The entire operation proceeded smoothly; there was no build up of silver in the nozzle and no flaking off of silver which would cause defective mirrors.

It will be noted that the present invention provides a method of spray silvering in which all the component solutions are sprayed in premixed form from a single nozzle or a plurality of such nozzles, producing a uniform mixture of reacting solutions which are sprayed on the glass or other surface to be silvered, producing uniform dense silver coatings, and in which, notwithstanding the use of a single spray nozzle or a plurality of such single nozzles, there is no silver build up in the nozzle or nozzles with consequent choking off of the nozzle or nozzles or flaking off of silver during the operation, which flaking off would cause the formation of defective mirrors.

Since certain changes may be made in the above described process of spray silvering which embody this invention, without departing from the scope of this invention, it is intended that all matter contained in the above description or shown in the accompanying drawings shall be interpreted as illustrative and not in a limiting sense.

What is claimed is:

1. A process of spray silvering which comprises continuously flowing a stream of concentrated reducible silver salt solution, continuously flowing a stream of concentrated reducing solution at substantially the same rate as said stream of silver salt solution, continuously flowing a stream of carrier and diluent water in a volume of from 10 to 100 times the volume of said silver salt solution, co-mingling all three streams to produce a mixed stream containing water, reducible silver salt solution and reducing solution in a state of reactivity such as to deposit silver in a uniform dense layer upon the spraying of said mixed stream onto a support, and spraying said mixed stream onto said support.

2. The process of spray silvering which comprises moving a surface to be silvered, moving at least one spray nozzle back and forth transverse to the direction of movement of said surface and at a rate to apply a plurality of successive applications of sprayed solution to said surface, feeding a stream of carrier and diluent water, feeding a stream of concentrated ammoniacal silver salt solution in a volume of from $\frac{1}{10}$ to $\frac{1}{100}$ of the volume of said water stream, feeding a stream of reducing solution in a volume of $\frac{1}{10}$ to $\frac{1}{100}$ of the volume of said water stream, feeding a stream of alkali solution in a volume of from $\frac{1}{10}$ to $\frac{1}{100}$ of the volume of said water solution, mixing all of said streams and feeding the mixture to said nozzle.

3. The process of spray silvering which comprises moving a surface to be silvered, moving at least one spray nozzle back and forth in a direction transverse to the direction of movement of said surface and at a rate to apply a plurality of successive applications of sprayed solution to said surface, feeding a stream of carrier and diluent water under pressure, feeding a stream of concentrated ammoniacal silver salt solution in a volume of from $\frac{1}{10}$ to $\frac{1}{100}$ the volume of said water stream, feeding a stream of reducing solution in a volume of $\frac{1}{10}$ to $\frac{1}{100}$ of the volume of said water stream, feeding a stream of alkali solution in a volume of from $\frac{1}{10}$ to $\frac{1}{100}$ of the volume of said water solution, mixing all of said streams, and feeding the mixture to the reciprocating spray nozzle to spray same onto said surface to be silvered to deposit the silver thereon.

4. The process of spray silvering by spraying a reducible silver salt solution onto the surface to be silvered through a spray gun, which process comprises continuously flowing a stream of carrier and diluent water to said spray gun, continuously feeding into said stream of water (1) a stream of concentrated silver salt solution, and (2) a stream of concentrated reducing solution, the rate of flow of said water stream being within the range of from 10 to 100 times the rate of flow of said stream of silver salt solution, said stream of silver salt solution and reducing solution co-mingling with said water steam at a point before said spray gun such as to get intimate mixture of the three streams before the mixture exits from the spray gun and yet not so far removed from the spray gun that substantially complete reaction takes place between the silver salt solution and the reducing solution, maintaining the flow of said streams and the spraying of the resultant mixture onto the surface to be silvered during the silvering of said surface and interrupting the flow of said concentrated silver salt solution and reducing solution while continuing the flow of water through the spray gun to effect cleansing of the interior of the spray gun by the water stream and thus prevent clogging thereof.

5. The process of spray silvering by spraying a reducible ammoniacal silver salt solution onto the surface to be silvered through a spray gun, which process comprises continuously flowing a stream of carrier and diluent water, continuously feeding into said stream of water (1) a stream of concentrated ammoniacal silver salt solution, (2) a stream of concentrated reducing solution, and (3) a stream of aqueous alkali, the rate of flow of said water stream being within the range of from 10 to 100 times the rate of flow of each of said streams of silver salt solution, reducing solution and alkali, said streams of silver salt solution, reducing solution and alkali co-mingling with said water stream to produce an intimate mixture of the four streams in which only partial reaction takes place between the silver salt solution and the reducing solution, flowing the resultant mixture into and through said spray gun, the mixture being thus sprayed from said spray gun in a condition such that the reaction goes to substantial completion upon contact with said surface to produce a dense silver layer, maintaining the flow of said streams and the spraying of the resultant mixture onto the surface to be silvered during the silvering of said surface, interrupting the flow of said concentrated silver salt solution, reducing solution and alkali while continuing the flow of water through the spray gun to effect cleansing of the interior of the spray gun by the water stream and thus prevent clogging thereof.

References Cited in the file of this patent
UNITED STATES PATENTS

| | | |
|---|---|---|
| 1,593,998 | Bart | July 27, 1926 |
| 2,214,476 | Peacock | Sept. 10, 1940 |
| 2,363,354 | Peacock | Nov. 21, 1944 |
| 2,445,253 | Verhoek et al. | July 13, 1945 |
| 2,598,391 | Jones | May 27, 1952 |
| 2,739,013 | Muller | Mar. 20, 1956 |
| 2,815,298 | Heffley | Dec. 3, 1957 |

UNITED STATES PATENT OFFICE
CERTIFICATION OF CORRECTION

Patent No. 2,963,383                       December 6, 1960

Arthur R. Weinrich

It is hereby certified that error appears in the above numbered patent requiring correction and that the said Letters Patent should read as corrected below.

Column 2, line 65, for "soution" read -- solution --; line 66, for "onto" read -- into --; column 3, line 75, for "0.5%" read -- 0.05% --; column 5, line 53, for "independent" read -- dependent --; column 7, line 42, for "steram" read -- stream --.

Signed and sealed this 13th day of June 1961.

(SEAL)
Attest:

ERNEST W. SWIDER
Attesting Officer

DAVID L. LADD
Commissioner of Patents